(12) United States Patent
Ruutu et al.

(10) Patent No.: US 12,542,854 B2
(45) Date of Patent: Feb. 3, 2026

(54) METHOD FOR CALL SECURITY

(71) Applicant: ELISA OYJ, Helsinki (FI)

(72) Inventors: Jussi Ruutu, Helsinki (FI); Ville Ruutu, Helsinki (FI); Honain Derrar, Helsinki (FI)

(73) Assignee: ELISA OYJ, Helsinki (FI)

( * ) Notice: Subject to any disclaimer, the term of this patent is extended or adjusted under 35 U.S.C. 154(b) by 0 days.

(21) Appl. No.: 19/110,894

(22) PCT Filed: Sep. 21, 2023

(86) PCT No.: PCT/FI2023/050540
§ 371 (c)(1),
(2) Date: Mar. 12, 2025

(87) PCT Pub. No.: WO2024/069047
PCT Pub. Date: Apr. 4, 2024

(65) Prior Publication Data
US 2025/0267213 A1    Aug. 21, 2025

(30) Foreign Application Priority Data
Sep. 30, 2022   (FI) ..................................... 20225869

(51) Int. Cl.
*H04M 3/436*     (2006.01)
*G10L 19/018*    (2013.01)
*H04L 9/08*      (2006.01)
*H04L 9/32*      (2006.01)

(52) U.S. Cl.
CPC ........... *H04M 3/436* (2013.01); *G10L 19/018* (2013.01); *H04L 9/0825* (2013.01); *H04L 9/3231* (2013.01)

(58) Field of Classification Search
CPC .... H04M 3/436; G10L 19/018; H04L 9/0825; H04L 9/3231
See application file for complete search history.

(56) References Cited

U.S. PATENT DOCUMENTS

| | | | |
|---|---|---|---|
| 10,511,712 B2* | 12/2019 | Horton | H04M 3/42068 |
| 10,659,588 B1* | 5/2020 | Guan | G10L 17/04 |
| 10,681,207 B1* | 6/2020 | Johnson | H04M 3/42059 |
| 10,803,859 B1* | 10/2020 | Williams | G10L 17/06 |
| 11,302,335 B2* | 4/2022 | Breuer | G10L 17/26 |
| 2001/0035814 A1 | 11/2001 | Uchida | |
| 2010/0119046 A1 | 5/2010 | Hoblit et al. | |
| 2014/0112457 A1* | 4/2014 | Xing | H04M 3/436 379/32.01 |

(Continued)

FOREIGN PATENT DOCUMENTS

| | | | | |
|---|---|---|---|---|
| CA | 3141829 A1 * | 12/2020 | ............. | H04L 63/18 |
| EP | 3796325 A1 * | 3/2021 | ............. | G16H 20/10 |

(Continued)

*Primary Examiner* — Nizar N Sivji
(74) *Attorney, Agent, or Firm* — S.J. Intellectual Property Ltd.

(57) ABSTRACT

According to an embodiment, a method for call security, the method comprises: agreeing, by a first party and a second party, about an acoustic fingerprint between the first party and the second party; performing a voice call, by the first party, calling the second party; applying, by the first party, the acoustic fingerprint to the voice call; and detecting, by the second party, the acoustic fingerprint in the voice call.

12 Claims, 3 Drawing Sheets

(56) References Cited

U.S. PATENT DOCUMENTS

| | | |
|---|---|---|
| 2014/0177841 A1 | 6/2014 | Hazzani et al. |
| 2015/0117439 A1* | 4/2015 | Efrati ................ H04M 3/42059 |
| | | 370/352 |
| 2015/0287416 A1 | 10/2015 | Brands et al. |
| 2019/0013038 A1* | 1/2019 | Thomson ................ G06F 40/20 |
| 2021/0136200 A1 | 5/2021 | Li et al. |
| 2022/0046126 A1* | 2/2022 | Grabowski ........... H04M 3/436 |
| 2022/0224795 A1* | 7/2022 | Li ....................... H04M 3/4365 |
| 2022/0270618 A1 | 8/2022 | Zhang et al. |

FOREIGN PATENT DOCUMENTS

| | | | |
|---|---|---|---|
| JP | 2004519929 A | * | 7/2004 |
| WO | WO 2007033458 A1 | * | 3/2007 |

\* cited by examiner

METHOD FOR CALL SECURITY

TECHNICAL FIELD

The present disclosure relates to call security, and more particularly to a method for call security, a system for performing the method, and a computer program product.

BACKGROUND

One of the current trends is the increase of various malicious telephone calls that can aim to, for example, fish sensitive information, such as passwords and usernames. For example, a malicious caller can impersonate a service desk agent of a well-known company and request some urgent, sensitive information so that the service could be continued. This is partially possible due to it being increasingly easy to counterfeit the caller's telephone number. In addition, voice calls are by their nature real-time, and it can be difficult for the recipient of the call to verify the authenticity of the caller or his/her intentions. This has led to a situation in which many people do not want to answer incoming telephone calls.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective to provide a method for call security, a system for performing the method, and a computer program product. The foregoing and other objectives are achieved by the features of the independent claims. Further implementation forms are apparent from the dependent claims, the description and the figures.

According to a first aspect, a method for call security comprises: agreeing, by a first party and a second party, about an acoustic fingerprint between the first party and the second party; performing a voice call, by the first party, calling the second party; applying, by the first party, the acoustic fingerprint to the voice call; and detecting, by the second party, the acoustic fingerprint in the voice call. The method can, for example, improve call security.

In an implementation form of the first aspect, the acoustic fingerprint is detected in the voice call by: a user corresponding to the second party; and/or a device used by the user corresponding to the second party, and the method further comprises, in response to detecting the acoustic fingerprint in the voice call, providing, by the device, an indication to the user that the voice call is performed by the first party. The method can, for example, enable the device to improve call security.

In another implementation form of the first aspect, the method further comprises, in response to not detecting the acoustic fingerprint in the voice call, providing, by the device, an alert to the user that the voice call is not performed by the first party. The method can, for example, enable the device to warn the user about possibly malicious calls.

In another implementation form of the first aspect, the device comprises a mobile device.

In another implementation form of the first aspect, the acoustic fingerprint is detected by software on the mobile device. The method can, for example, be used with various mobile devices with a high degree of compatibility.

In another implementation form of the first aspect, the agreeing about the acoustic fingerprint between the first party and the second party comprises: providing, by the first party, the acoustic fingerprint to a server; and obtaining, by the second party, the acoustic fingerprint from the server. The method can, for example, enable the first party and the second party to efficiently agree on the acoustic fingerprint.

In another implementation form of the first aspect, the method further comprises: periodically providing, by the first party, an updated acoustic fingerprint to a server; and periodically obtaining, by the second party, the updated acoustic fingerprint from the server. The method can, for example, enable the first party and the second party to efficiently agree on the acoustic fingerprint and keep the acoustic fingerprint up-to-date.

In another implementation form of the first aspect, the agreeing about the acoustic fingerprint between the first party and the second party comprises: providing a public key of the second party to the first party, wherein the public key of the second party corresponds to a private key of the second party; encrypting, by the first party, data indicating the acoustic fingerprint using the public key of the second party; transmitting, by the first party, the encrypted data indicating the acoustic fingerprint to the second party; and decrypting, by the second party, the encrypted data indicating the acoustic fingerprint using the private key of the second party. The method can, for example, enable the first party and the second party agree on the acoustic fingerprint in a secure manner.

In another implementation form of the first aspect, the acoustic fingerprint defines a set of frequencies to be applied to the voice call and the detecting the acoustic fingerprint in the voice call comprises: performing, by the second party, spectrum analysis on the voice call; and detecting, by the second party, the set of frequencies defined by the acoustic fingerprint in the voice call based on the spectrum analysis. The method can, for example, enable the acoustic fingerprint to be efficiently transferred in the voice call while not adversely affecting the voice call.

In another implementation form of the first aspect, the acoustic fingerprint defines a set of amplitude changes to be applied to the voice call and the detecting the acoustic fingerprint in the voice call comprises: performing, by the second party, amplitude analysis on the voice call; and detecting, by the second party, the set of amplitude changes defined by the acoustic fingerprint in the voice call. The method can, for example, enable the acoustic fingerprint to be efficiently transferred in the voice call.

In another implementation form of the first aspect, the acoustic fingerprint defines an acoustic background to be applied to the voice call. The method can, for example, enable the acoustic fingerprint to be easily detected in the voice call.

In another implementation form of the first aspect, the acoustic fingerprint comprises a code-based acoustic fingerprint. The method can, for example, enable the acoustic fingerprint to be efficiently transferred in the voice call.

In another implementation form of the first aspect, the code-based acoustic fingerprint defines a frequency hopping pattern to be applied to the voice call.

According to a second aspect, a system for performing the method according to the first aspect comprises: a first device comprising at least one processor and at least one memory including computer program code, the at least one memory and the computer program code configured to, with the at least one processor, cause the first device to perform the operations of the first party; and a second device comprising at least one processor and at least one memory including computer program code, the at least one memory and the computer program code configured to, with the at least one processor, cause the second device to perform the operations of the second party.

According to a third aspect, a computer program product comprises program code configured to perform the operations of the first party and/or the operations of the second party of the method according to the first aspect when the computer program product is executed on a computer.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

In the following, like reference numerals are used to designate like parts in the accompanying drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
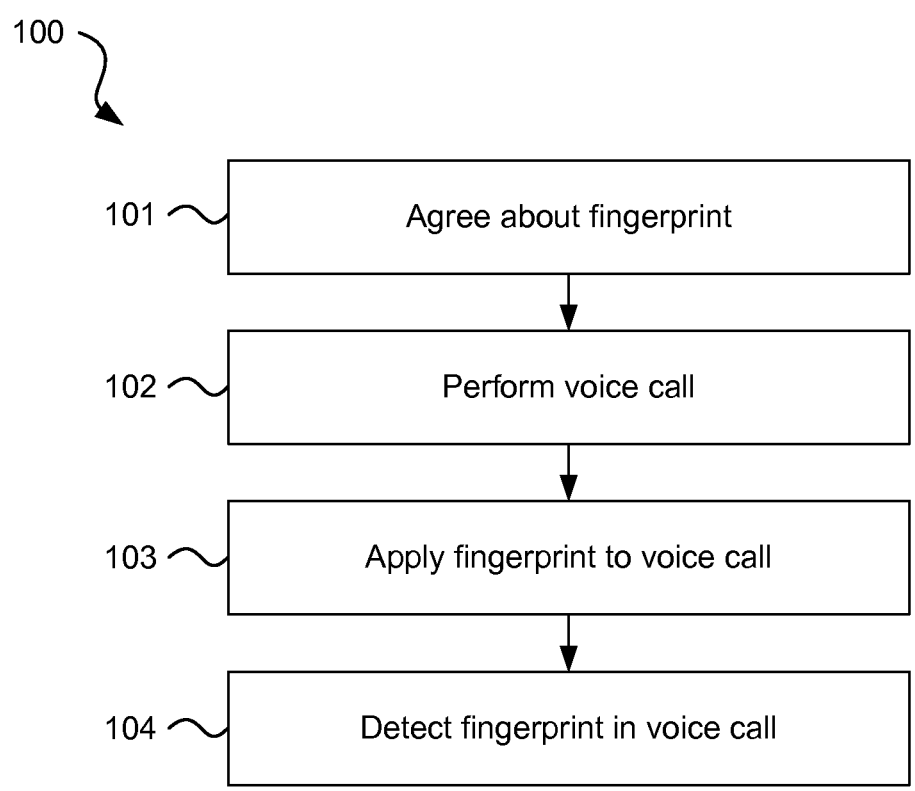
FIG. 1 illustrates a flow chart representation of a method according to an embodiment.

FIG. 1 illustrates a flow chart representation of a method according to an embodiment.

According to an embodiment, a method 100 for call security comprises agreeing 101, by a first party and a second party, about an acoustic fingerprint between the first party and the second party.

Herein, an acoustic fingerprint may also be referred to as a fingerprint or similar.

The method 100 may further comprise performing 102 a voice call, by the first party, calling the second party.

The call can be made by, for example, a service desk agent or an automated call processing system of the first party.

The voice call can comprise, for example, a telephone call, a voice over internet protocol (VoIP) call, or any other type of voice call.

The method 100 may further comprise applying 103, by the first party, the acoustic fingerprint to the voice call.

The applying 103 the acoustic fingerprint to the voice call may comprise, for example, modifying an audio stream of the voice call in a manner indicated by the acoustic fingerprint. For example, the audio stream of the voice call may be manipulated in temporal and/or frequency domain in a manner indicated by the acoustic fingerprint. Some examples of applying 103 the acoustic fingerprint to the voice call are disclosed in the embodiments herein.

The method 100 may further comprise detecting 104, by the second party, the acoustic fingerprint in the voice call.

The detecting 104 the acoustic fingerprint in the voice call may comprise, for example, analysing an audio stream of the voice call in order to extract the acoustic fingerprint. Since the first party and the second party have agreed on the acoustic fingerprint, the second party can check whether audio call comprises the agreed acoustic fingerprint. For example, the second party can analyse the audio stream of the voice call in temporal and/or frequency domain.

The method 100 may further comprise, in response to detecting the acoustic fingerprint in the voice call, deducing, by the second party, that the voice call is initiated by the first party.

Herein, a voice call being secure may indicate that the voice call is made, with at least some degree of certainty, by the first party and not by, for example, someone impersonating the first party.

The detecting 104, by the second party, the acoustic fingerprint in the voice call may comprise, for example, checking, by the second party, whether the voice call comprises the acoustic fingerprint. The method 100 may further comprise, in response to the voice call comprising the acoustic fingerprint, deducing, by the second party, that the voice call is initiated by the first party. The method 100 may further comprise, in response to the voice call not comprising the acoustic fingerprint, deducing, by the second party, that the voice call is not initiated by the first party.

The method 100 can alleviate some of the problems described herein by applying the acoustic fingerprint to the voice call. The acoustic fingerprint or its absence can be used to enhance the security of voice calls. The fingerprint can be added to the audio stream, and then detected by the second party receiving the call.

The method 100 can use, for example, in-band signalling for applying 103 the acoustic fingerprint to the voice call.

For example, the acoustic fingerprint can be embodied in a background signal of the voice call. For example, the acoustic fingerprint can correspond to some audio frequencies that are carried among the audio signal of the voice call. This frequency and its amplitude can change over time, which allows to carry more information about the acoustic fingerprint. It is possible to use frequencies that are hard or impossible for humans to hear so that the in-band signalling does not interfere with the actual conversation of the voice call. Furthermore, by changing the frequency quickly, it is possible to reduce the effects of in-band signalling.

Alternatively or additionally to in-band signalling, the method 100 can also apply the acoustic fingerprint to the voice call by modifying the audio stream of the voice call with various methods. For example, some audio frequencies may be filtered out or reduced in amplitude so that the original audio frequency spectrum is modified. Such modification may be static, or it may vary over time.

The method 100 can be used to detect the identity of one or more parties in the voice call and/or to detect possible security anomaly in the voice call.

The method 100 may improve the popularity of voice calls especially with sensitive issues such as customer service transactions.

The method 100 can be applied to human-to-human calls and/or to human-to-machine communication, such as voice bots and similar systems.

Herein, some disclosure may be described in terms of functionality of a system. A system may refer to any system configured to perform the method 100 or some parts of the method 100. Any disclosure in relation to such a system can also be applied to the method 100 and vice versa.

Any disclosure herein may also be applied both ways and simultaneously between the first party and the second party. Thus, both parties can apply their own acoustic fingerprints to the voice call and the other party can detect the acoustic fingerprint in the voice call. Therefore, any functionality performed by the first party disclosed herein may also be performed by the second party and vice versa.

Figure 2:
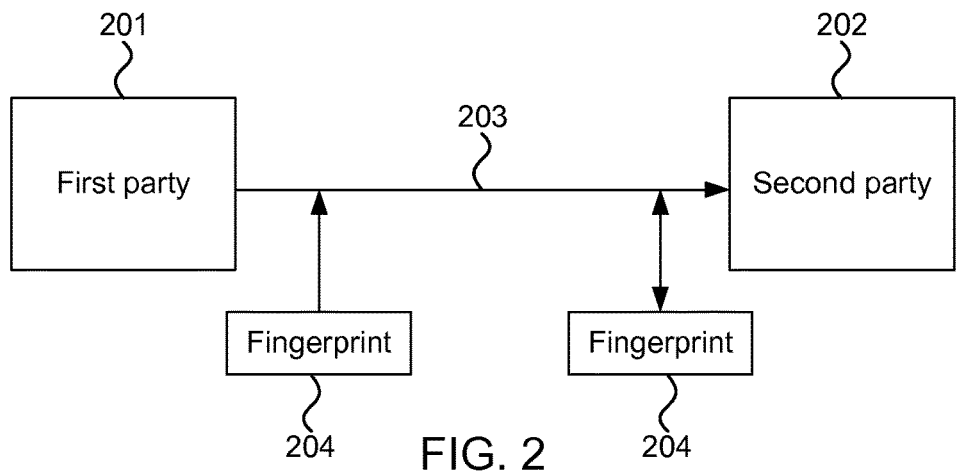
FIG. 2 illustrates a schematic representation of data flow between a first party and a second party according to an embodiment.

FIG. 2 illustrates a schematic representation of data flow between a first party and a second party during a voice call according to an embodiment.

In the embodiment of FIG. 2, the first party 201 applies the acoustic fingerprint 204 to the voice call 203. The second party 204 also possesses information about the acoustic fingerprint 204 due to the first party 201 and the second party 202 agreeing 101 about the acoustic fingerprint 204. Thus, the second party 202 can check whether the voice call 203 comprises the acoustic fingerprint 204 in order to verify that the voice call 203 is indeed being made by the first party 201.

In some embodiments, the agreeing 101 about the acoustic fingerprint between the first party 201 and the second party 202 can be performed by a company, corresponding to the first party 201, publicly disclosing, for example on their web site, that their customer service telephone calls contain certain acoustic fingerprint 204.

In some embodiments, the agreeing 101 about the acoustic fingerprint between the first party 201 and the second party 202 can be performed by an organization corresponding to the first party 201 disclosing the nature of the acoustic fingerprint 204 only to their customers, corresponding to the second party 202, own employees etc.

In some embodiments, the acoustic fingerprint 204 may be user-specific and can be communicated only to the user corresponding to the second party 202.

In some embodiments, the acoustic fingerprint 204 may not be communicated to humans. Instead, the acoustic fingerprint 204 may be communicated between a server, corresponding to the first party 201, and a mobile application on, for example, a smart phone, corresponding to the second party 202.

In some embodiments, the acoustic fingerprint 204 can be based on a public key/private key type approach.

According to an embodiment, the acoustic fingerprint 204 defines an acoustic background to be applied to the voice call 203.

In some embodiments, the first party 201 can apply the acoustic fingerprint 204 to the voice call 203 by making the voice call 203 in an environment that has certain acoustic characteristics, such as background voices from other customer service agents, no background voices at all etc.

In some embodiments, the first party 201 can apply the acoustic fingerprint 204 to the voice call 203 by using some analogue means to apply the acoustic fingerprint 204 to the voice call 203. For example, a periodic background signal made by a mechanical metronome or a clock, using analogue electric circuits to produce certain audio frequencies that are picked up by the microphone or inserted to an analogue audio signal coming from microphone etc.

In some embodiments, the first party 201 can apply the acoustic fingerprint 204 to the voice call 203 by using digital technologies such as inserting certain audio frequencies to the digitalized audio stream, processing the digital audio stream with various known methods of digital signal processing etc. For example, the first party 201 may synthesize any of the aforementioned analogue acoustic characteristics into the voice call 203.

In some embodiments, the second party 202 can detect the acoustic fingerprint 204 in the voice call 203 by using human's hearing to detect the agreed acoustic fingerprint 204.

According to an embodiment, the acoustic fingerprint 204 defines a set of frequencies to be applied to the voice call 203, and the detecting 104 the acoustic fingerprint 204 in the voice call comprises: performing, by the second party 202, spectrum analysis on the voice call 203 and detecting, by the second party 202, the set of frequencies defined by the acoustic fingerprint 204 in the voice call 203 based on the spectrum analysis.

The acoustic fingerprint 204 can define to add certain frequencies into the voice call 203 and/or filter away, partially or completely, certain frequencies from the voice call 203. Thus, the set of frequencies to be applied to the voice call 203 can comprise frequencies to be added and/or to be removed partially and/or completely, to/from the voice call 203.

The set of frequencies to be applied to the voice call 203 may be outside the typical range of human hearing. Thus, the acoustic fingerprint 204 may not adversely affect the sound quality of the voice call 203.

In some embodiments, the second party 202 can detect the acoustic fingerprint 204 in the voice call 203 by using signal processing, such as Fast Fourier Transform that performs a spectrum analysis of the acoustic signal of the voice call 203 and detects frequencies in the voice call 203. The presence/absence of frequencies corresponding to the acoustic fingerprint 204 can be determined from the frequency spectrum.

According to an embodiment, the acoustic fingerprint 204 comprises a code-based acoustic fingerprint.

According to an embodiment, the code-based acoustic fingerprint defines a frequency hopping pattern to be applied to the voice call 203.

In some embodiments, the second party 202 can detect the acoustic fingerprint 204 in the voice call 203 using Code Division Multiple Access (CDMA) type approach, where the acoustic fingerprint 204 corresponds to a code-based acoustic fingerprint embedded in the audio signal of the voice call 203. For example, a code can define a frequency hopping pattern for the acoustic signal of the voice call 203. The detection can utilise a code that can be obtained from, for example, a trusted server or similar.

According to an embodiment, the acoustic fingerprint 204 defines a set of amplitude changes to be applied to the voice call 203 and the detecting 104 the acoustic fingerprint 204 in the voice call 203 comprises: performing, by the second party 202, amplitude analysis on the voice call 203; and detecting, by the second party 202, the set of amplitude changes defined by the acoustic fingerprint 204 in the voice call 203.

For example, the amplitude/volume of the voice call 203 can increase or decrease for a specific amount of time, such as for one second, periodically, such as every five seconds.

In some embodiments, the acoustic fingerprint 204 can define both a set of frequencies to be applied to the voice call 203 and a set of amplitude changes to be applied to the voice call 203. The second party 202 can detect the acoustic fingerprint by combining the corresponding detection methods disclosed herein.

Figure 3:
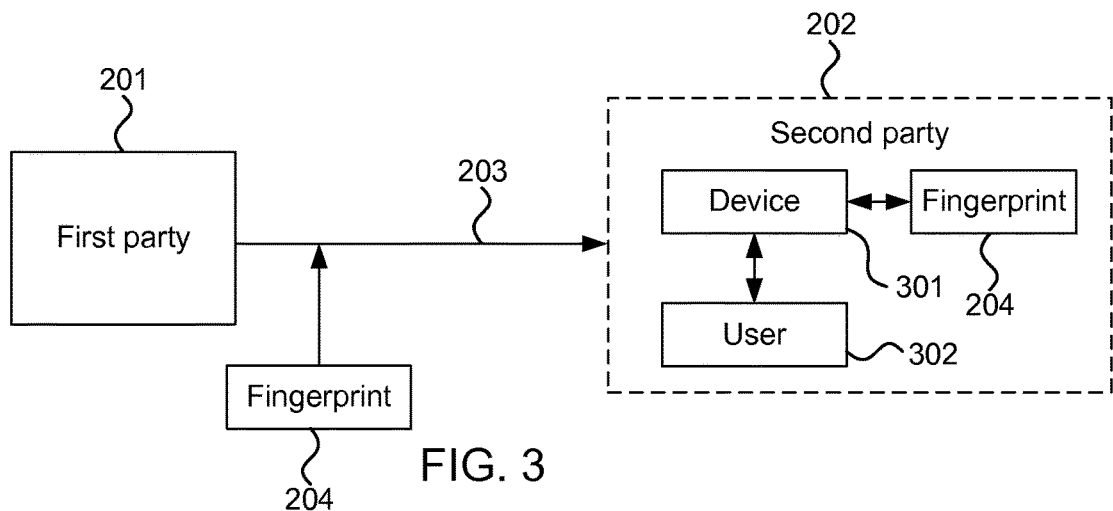
FIG. 3 illustrates a schematic representation of data flow between a first party and a second party during a voice call according to an embodiment.

FIG. 3 illustrates a schematic representation of data flow between a first party and a second party during a voice call according to an embodiment.

In some embodiments, the second party 202 can detect the acoustic fingerprint 204 in the voice call 203 using a device 301 used for the voice call 203, such as mobile telephone. The device 301 may contain functionality that detects the status of the acoustic fingerprint 204 and informs the user 302 via, for example, a user interface.

According to an embodiment, the acoustic fingerprint is detected in the voice call 203 by a device 301 used by the user 302 corresponding to the second party 202, and the method 100 further comprises, in response to detecting the acoustic fingerprint 204 in the voice call 203, providing, by the device 301, an indication to the user 302 that the voice call 203 is performed by the first party 201.

According to an embodiment, the method 100 further comprises, in response to not detecting the acoustic fingerprint 204 in the voice call 203, providing, by the device 301, an alert to the user 302 that the voice call 203 is not performed by the first party 201.

According to an embodiment, the device 301 comprises a mobile device.

The mobile device may comprise, for example, a phone, such as a mobile phone or a smart phone, a laptop computer, a tablet, or any other device capable of receiving a voice call, for example via a wireless network and/or the internet.

According to an embodiment, the acoustic fingerprint 204 is detected by software on the mobile device.

The mobile device may comprise an application for detecting the acoustic fingerprint 204 in the voice call 203. When the person receives a voice call 203, the audio stream of the voice call can be provided to the application and the application can analyse the voice call 203 for the presence of the acoustic fingerprint 204 while the user 302 is on the call. The application can, for example, automatically obtain the agreed acoustic fingerprint from, for example, a server. If the acoustic fingerprint in the voice call 203 matches the fingerprint obtained from the server, the application can indicate this to the user 302. If not, an alarm can be provided.

According to an embodiment, the acoustic fingerprint 204 is detected in the voice call 203 by a user 302 corresponding to the second party 202.

The method 100 may comprise, in response to detecting the acoustic fingerprint 204 in the voice call 203, the user 302 noticing the absence of the correct acoustic fingerprint.

For example, if the acoustic fingerprint 204 is an acoustic background noise applied to the voice call 203, the user 302 can detect the acoustic fingerprint 204 in the voice call 203 by ear.

Figure 4:
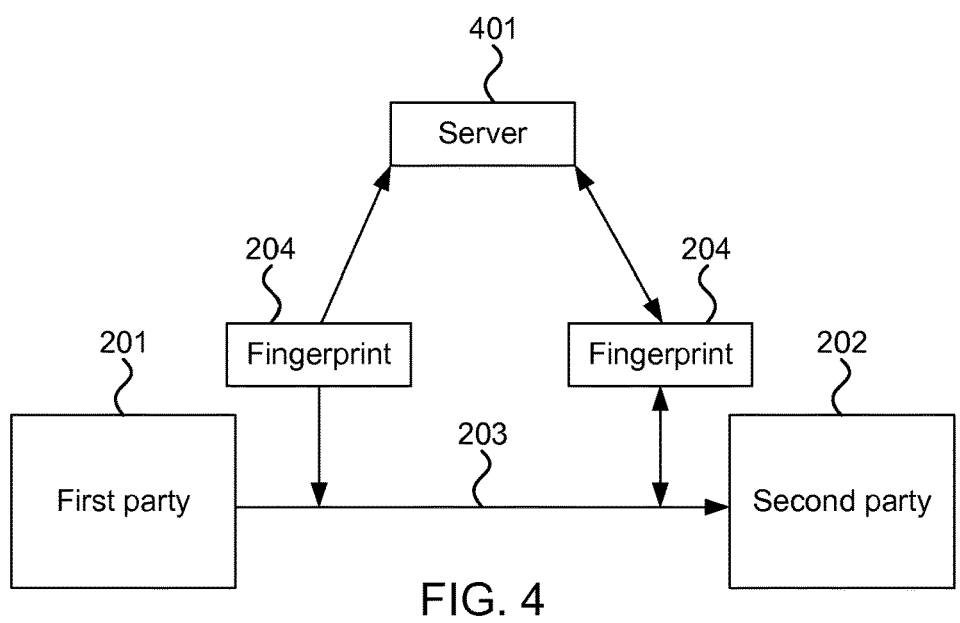
FIG. 4 illustrates a schematic representation of data flow between a first party and a second party in an acoustic fingerprint agreement process according to an embodiment.

FIG. 4 illustrates a schematic representation of data flow between a first party and a second party in an acoustic fingerprint agreement process according to an embodiment.

According to an embodiment, the agreeing 101 about the acoustic fingerprint between the first party 201 and the second party 202 comprises providing, by the first party 201, the acoustic fingerprint 204 to a server 401 and obtaining, by the second party 202, the acoustic fingerprint 204 from the server 401.

According to an embodiment, the method 100 further comprises periodically providing, by the first party 201, an updated acoustic fingerprint to a server 401 and periodically obtaining, by the second party 202, the updated acoustic fingerprint from the server 401.

For example, a person can subscribe to a service of a telecom operator. The person has installed to their mobile telephone a mobile application that comprises the acoustic fingerprint functionality. The mobile application can fetch the acoustic fingerprint 204 from a server 401. This fingerprint may change periodically, such as once a day, once a week or once a month, and be unique to each user. When a contact centre of the telecom operator calls the person about subscribed services, the contact centre software can insert the correct acoustic fingerprint 204, such as certain frequencies, code etc. into the voice call 203. When the person receives the voice call 203, the audio stream can be forked to the mobile application that analyses the acoustic fingerprint 204. If the analysed fingerprint matches the fingerprint obtained from the server 401, the application can indicate this to the user. If not, an alarm can be provided.

In some embodiments, the agreeing about the acoustic fingerprint can occur via, for example, as human interaction between the first party 201 and the second party 202. For example, a user corresponding to the second party 202 can visit an establishment of a service provider corresponding to the first party 201 and they can agree about the acoustic fingerprint 204.

In another example, a person can subscribe to the service of a telecom operator. The person can agree with the telecom operator about an acoustic background that is used for calls from the telecom operator. For example, clock ticking in the background, waves breaking at a seashore, some music in the background etc. When a contact centre of the telecom operator calls the person about the subscribed services, the person can hear the agreed background by ear and verify at least to some degree about the authenticity of the voice call.

Figure 5:
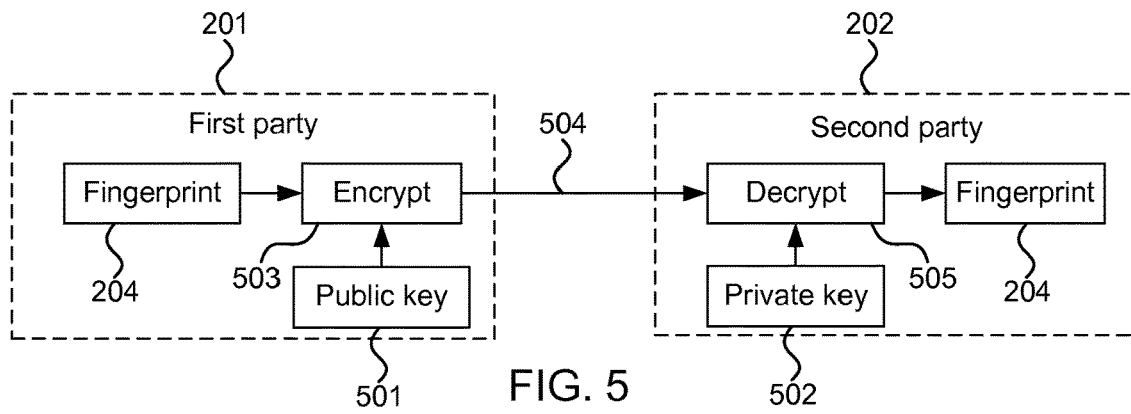
FIG. 5 illustrates a schematic representation of data flow between a first party and a second party in an acoustic fingerprint agreement process according to an embodiment.

FIG. 5 illustrates a schematic representation of data flow between a first party and a second party in an acoustic fingerprint agreement process according to an embodiment.

According to an embodiment, the agreeing 101 about the acoustic fingerprint between the first party 201 and the second party 202 comprises providing a public key 501 of the second party 202 to the first party 201, wherein the public key 501 of the second party 202 corresponds to a private key 502 of the second party 202; encrypting 503, by the first party 201, data indicating the acoustic fingerprint 204 using the public key 501 of the second party 202; transmitting, by the first party 201, the encrypted data 504 indicating the acoustic fingerprint 204 to the second party 202; and decrypting 505, by the second party 202, the encrypted data 504 indicating the acoustic fingerprint 204 using the private key 502 of the second party 202.

The acoustic fingerprint 204 can be agreed using a public/private key approach, for example in a manner disclosed above. For example, when the first party 201, such as a company, calls the second party 202, such as a user/customer, a mobile phone of the user can contact a server of the first party 201, obtain data indicating the acoustic fingerprint 204 encrypted with a public key 501 of the user and then decrypt it using a private key 502 of the user.

Alternatively, the acoustic fingerprint 204 can be agreed using a public/private key approach in various other manners. For example, the second party 202 may obtain the acoustic fingerprint 204 from the first party 201 and/or a server of the first party 201 using Hypertext Transfer Protocol Secure (HTTPS), Transport Layer Security (TLS), and/or any other protocol that utilises a public/private key approach.

Figure 6:
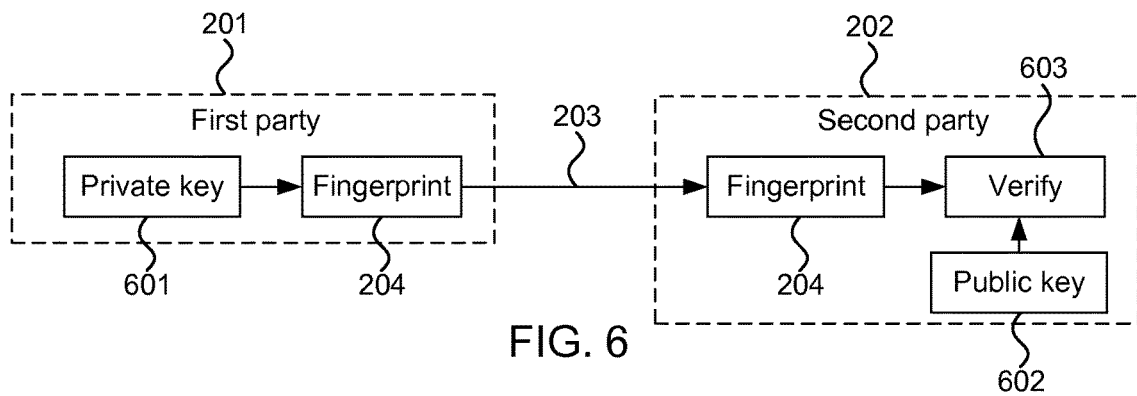
FIG. 6 illustrates a schematic representation of data flow between a first party and a second party during a voice call according to an embodiment.

FIG. 6 illustrates a schematic representation of data flow between a first party and a second party during a voice call according to an embodiment.

In some embodiments, the acoustic fingerprint 204 can also function as a signature of the first party 201. For example, the first party 201 can sign a piece of data using a private key 601 of the first party 201. The signed piece of data can function as the acoustic fingerprint 204 and can be applied to the voice call 203 using, for example, any technique disclosed herein or in some other manner. For example, the acoustic fingerprint 204 can be encoded into the voice call 203 using a set of frequencies, amplitude changes, code-based encoding etc.

The second party 202 can obtain a public key 602 of the first party 201 corresponding to the private key 601 of the first party 201. The first party 201 can provide the public key 602 to public distribution using a server or any other means. The second party 202 can also detect the acoustic fingerprint 204 in the voice call 203. Using the public key 602, the second party 202 can verify 603 that the acoustic fingerprint 204 has been signed by the first party 201 and that, therefore, the voice call is made by the first party 201.

It should be appreciated that the agreeing 101 about the acoustic fingerprint 204 between the first party 201 and the second party 202 is not limited to agreeing about the exact content of the acoustic fingerprint 204. For example, in the embodiment of FIG. 6, the first party 201 and the second party 202 only need to agree that the first party 201 will use the private key 601 of the first party 201 to sign the acoustic fingerprint 204 and that the second party 202 should use the public key 602 of the first party 201 to verify 603 the signature in the acoustic fingerprint 204. On the other hand, in other embodiments, such as in some of those disclosed herein, the first party 201 and the second party 202 can agree 101 about the exact content of the acoustic fingerprint 204.

Figure 7:
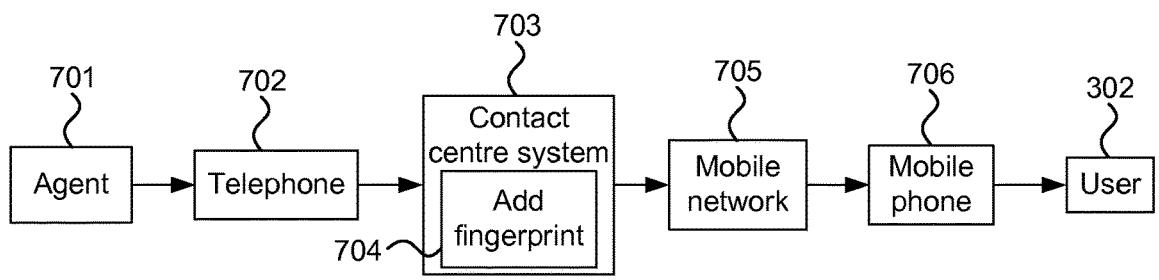
FIG. 7 illustrates a schematic representation of data flow between a first party and a second party during a voice call according to an embodiment.

FIG. 7 illustrates a schematic representation of data flow between a first party and a second party during a voice call according to an embodiment.

An agent 701 of the first party 201, such as a customer service agent, can make a call to a user 302, such as a customer, corresponding to the second party 202. Alternatively, the agent 701 may be a voice bot or a similar automated system.

Audio of the agent 701 can be conveyed from a telephone 702 to a contact centre system 703. The contact centre system 703 can add 704 the correct acoustic fingerprint 204 based on, for example, the service the voice call 203 relates to, the user 302, etc.

The audio of the agent 701 with the added acoustic fingerprint can be carried over a mobile network 705 to the mobile phone 706 of the user 302. The mobile phone 706 can comprise software that is configured to detect the acoustic fingerprint 204. The user 302 can be informed about the status of the acoustic fingerprint 204 in the voice call 203 by the software.

Figure 8:
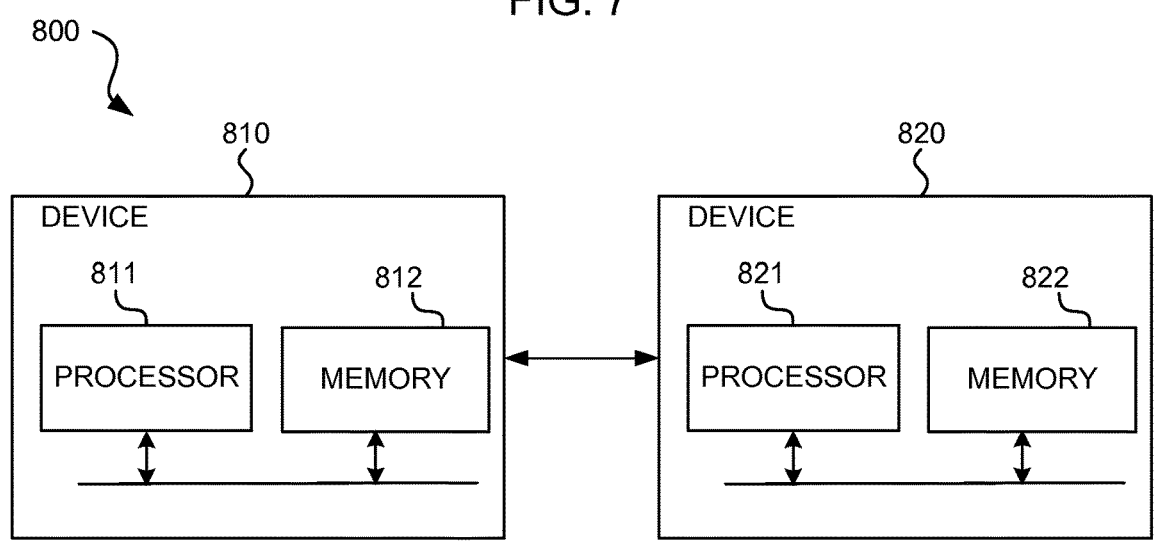
FIG. 8 illustrates a schematic representation of a system according to an embodiment.

FIG. 8 illustrates a schematic representation of a system according to an embodiment.

According to an embodiment, a system 800 for performing the method 100 comprises a first device 810 and a second device 820.

The first device 810 can comprise at least one processor 811 and at least one memory 812 including computer program code, the at least one memory 812 and the computer program code being configured to, with the at least one processor 811, cause the first device 810 to perform the operations of the first party 201.

The second device 820 can comprise at least one processor 821 and at least one memory 822 including computer program code, the at least one memory 822 and the computer program code being configured to, with the at least one processor 821, cause the second device 820 to perform the operations of the second party 202.

The at least one processor 811, 821 may comprise, for example, one or more of various processing devices, such as a co-processor, a microprocessor, a digital signal processor (DSP), a processing circuitry with or without an accompanying DSP, or various other processing devices including integrated circuits such as, for example, an application specific integrated circuit (ASIC), a field programmable gate array (FPGA), a microprocessor unit (MCU), a hardware accelerator, a special-purpose computer chip, or the like.

The memory 812, 822 may be configured to store, for example, computer programs and the like. The memory 812, 822 may comprise one or more volatile memory devices, one or more non-volatile memory devices, and/or a combination of one or more volatile memory devices and non-volatile memory devices. For example, the memory 812, 822 may be embodied as magnetic storage devices (such as hard disk drives, magnetic tapes, etc.), optical magnetic storage devices, and semiconductor memories (such as mask ROM, PROM (programmable ROM), EPROM (erasable PROM), flash ROM, RAM (random access memory), etc.).

The devices 810, 820 may further comprise other components not illustrated in the embodiment of FIG. 8. The computing devices 810, 820 may comprise, for example, an input/output bus for connecting the devices 810, 820 to other devices.

When the devices 810, 820 are configured to implement some functionality, some component and/or components of the devices 810, 820, such as the at least one processor 811, 821 and/or the memory 812, 822, may be configured to implement this functionality. Furthermore, when the at least one processor 811, 821 is configured to implement some functionality, this functionality may be implemented using program code comprised, for example, in the memory.

The devices 810, 820 may be implemented at least partially using, for example, a computer, some other computing device, or similar.

The method 100 and/or the system 800 may be utilised in, for example, automatic speech recognition (ASR) application such as in a so-called voicebot. The first party 201 can use a voicebot to call the second party 202. The first party 201 may correspond to, for example, a company and the second party 202 may correspond to a customer of that company. The voicebot can, for example, ask questions about, for example, basic information from a customer in a customer service situation over the phone, obtain the answers using ASR and interact with the customer. Since such an automated system can raise suspicions in the customer, the method 100 and the system 800 can improve the user experience and improve the security of the call.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method for call security, the method comprising: obtaining devices of a first and a second party and configuring the respective devices for agreeing, by a first party and a second party, about an acoustic fingerprint between the first party and the second party;
   wherein the agreeing about the acoustic fingerprint between the first party and the second party comprises:
      providing a public key of the second party to the first party, wherein the public key of the second party corresponds to a private key of the second party;
      encrypting, by the first party, data indicating the acoustic fingerprint using the public key of the second party;
      transmitting, by the first party, the encrypted data indicating the acoustic fingerprint to the second party; and
      decrypting, by the second party, the encrypted data indicating the acoustic fingerprint using the private key of the second party;
   performing a voice call, by the first party, calling the second party
   applying, by the first party, the acoustic fingerprint to the voice call by modifying an audio stream of the voice call in a manner indicated by the acoustic fingerprint; and
   detecting, by the second party, the acoustic fingerprint in the voice call;
   wherein the acoustic fingerprint defines a set of frequencies to be applied to the voice call and the detecting the acoustic fingerprint in the voice call comprises: performing, by the second party, spectrum analysis on the voice call; and detecting, by the second party, the set of frequencies defined by the acoustic fingerprint in the voice call based on the spectrum analysis or the acoustic fingerprint defines a set of amplitude changes to be applied to the voice call and the detecting the acoustic fingerprint in the voice call comprises: performing, by the second party, amplitude analysis on the voice call; and detecting, by the second party, the set of amplitude changes defined by the acoustic fingerprint in the voice call.

2. The method according to claim 1, wherein the acoustic fingerprint is detected in the voice call by:
   a user corresponding to the second party; and/or
   a device used by the user corresponding to the second party, and the method further comprises, in response to detecting the acoustic fingerprint in the voice call, providing, by the device, an indication to the user that the voice call is performed by the first party.

3. The method according to claim 2, the method further comprising, in response to not detecting the acoustic fingerprint in the voice call, providing, by the device, an alert to the user that the voice call is not performed by the first party.

4. The method according to claim 2, wherein the device comprises a mobile device.

5. The method according to claim 4, wherein the acoustic fingerprint is detected by software on the mobile device.

6. The method according to claim 1, wherein the agreeing about the acoustic fingerprint between the first party and the second party comprises:
   providing, by the first party, the acoustic fingerprint to a server; and
   obtaining, by the second party, the acoustic fingerprint from the server.

7. The method according to claim 6, the method further comprising:
   periodically providing, by the first party, an updated acoustic fingerprint to a server; and
   periodically obtaining, by the second party, the updated acoustic fingerprint from the server.

8. The method according to claim 1, wherein the acoustic fingerprint defines an acoustic background to be applied to the voice call.

9. The method according to claim 1, wherein the acoustic fingerprint comprises a code-based acoustic fingerprint.

10. The method according to claim 9, wherein the code-based acoustic fingerprint defines a frequency hopping pattern to be applied to the voice call.

11. A system for performing the method according to claim 1, the system comprising: a first device comprising at least one processor and at least one memory including computer program code, the at least one memory and the computer program code configured to, with the at least one processor, cause the first device to perform the operations of the first party; and a second device comprising at least one processor and at least one memory including computer program code, the at least one memory and the computer program code configured to, with the at least one processor, cause the second device to perform the operations of the second party.

12. A tangible, non-transitory memory device encoded with program instructions which, when run on a computing device, execute the operations of the first party and/or the operations of the second party of the method of claim 1.

* * * * *